United States Patent
Bedekar

(10) Patent No.: US 10,348,832 B2
(45) Date of Patent: Jul. 9, 2019

(54) METHODS AND SYSTEMS FOR SHARING CONTENT ON A TRANSPORTATION VEHICLE

(71) Applicant: Panasonic Avionics Corporation, Lake Forest, CA (US)

(72) Inventor: Neil Bedekar, Lake Forest, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 340 days.

(21) Appl. No.: 15/224,142

(22) Filed: Jul. 29, 2016

(65) Prior Publication Data

US 2018/0034911 A1  Feb. 1, 2018

(51) Int. Cl.
  *H04L 29/06*   (2006.01)
  *H04L 29/08*   (2006.01)

(52) U.S. Cl.
  CPC .......... *H04L 67/12* (2013.01); *H04L 65/4084* (2013.01); *H04L 67/104* (2013.01); *H04L 67/1044* (2013.01); *H04L 67/2857* (2013.01)

(58) Field of Classification Search
  CPC ....... H04N 21/4622; H04N 2201/0041; H04N 21/41407; H04N 21/47202; H04N 21/6125; H04N 21/482; H04N 21/4781; H04N 21/485; G09G 2380/10; H04B 1/082; H04W 84/042; H04W 84/12; H04L 67/12; H04L 67/1044; H04L 67/2857; H04L 67/22; H04L 29/12254; H04L 61/2036; G06F 16/4387; G06F 16/48; G06F 16/40; G06F 16/44; G08G 1/0112
  See application file for complete search history.

(56) References Cited

U.S. PATENT DOCUMENTS

| | | | |
|---|---|---|---|
| 5,421,031 A | 5/1995 | De Bey | |
| 5,701,582 A | 12/1997 | Debey | |
| 6,519,693 B1 | 2/2003 | Debey | |
| 7,340,500 B2* | 3/2008 | Traversat | G06F 9/4416 709/201 |
| 7,594,250 B2 | 9/2009 | Debey | |
| 7,793,282 B2 | 9/2010 | Debey | |
| 8,160,495 B2* | 4/2012 | Khedouri | G06F 17/30038 455/3.04 |
| 8,340,067 B2 | 12/2012 | Buga et al. | |
| 8,406,206 B2* | 3/2013 | Chiang | H04W 4/70 370/338 |
| 9,043,846 B2 | 5/2015 | Cline et al. | |
| 9,210,450 B2* | 12/2015 | Healy | H04N 21/2146 |
| 9,277,348 B2* | 3/2016 | Chiang | H04W 4/70 |
| 2002/0023230 A1* | 2/2002 | Bolnick | G06Q 30/02 726/28 |
| 2006/0138308 A1* | 6/2006 | Davis | H04B 1/082 250/215 |

(Continued)

*Primary Examiner* — Sargon N Nano

(74) *Attorney, Agent, or Firm* — Brian Furrer

(57) ABSTRACT

Methods and systems for a transportation vehicle are provided. For example, one method includes storing a first portion of a media file at a first device of a peer-to-peer group having a plurality of devices at a transportation vehicle; storing a remaining portion of the media file at one or more of the plurality of devices; using the first portion of the media file to start providing access to the media file; and retrieving the remaining portions of the media file, on-demand, from the one or more devices, based on resource utilization of the one or more devices.

16 Claims, 9 Drawing Sheets

(56) References Cited

U.S. PATENT DOCUMENTS

| | | | | |
|---|---|---|---|---|
| 2008/0114861 A1* | 5/2008 | Gildred | ............ | H04N 7/17336 |
| | | | | 709/219 |
| 2008/0178238 A1* | 7/2008 | Khedouri | .......... | G06F 17/30038 |
| | | | | 725/109 |
| 2009/0210697 A1* | 8/2009 | Chen | .................... | H04L 9/0861 |
| | | | | 713/153 |
| 2011/0107377 A1* | 5/2011 | Petrisor | ............ | H04L 12/40182 |
| | | | | 725/76 |
| 2011/0115286 A1* | 5/2011 | Petrisor | ............ | B64D 11/0015 |
| | | | | 307/9.1 |
| 2011/0126242 A1* | 5/2011 | Cline | ................ | B64D 11/0015 |
| | | | | 725/76 |
| 2011/0162016 A1* | 6/2011 | Petrisor | ................... | H04N 7/18 |
| | | | | 725/77 |
| 2013/0055321 A1* | 2/2013 | Cline | ................ | H04N 21/2146 |
| | | | | 725/77 |
| 2013/0081091 A1* | 3/2013 | Petrisor | ............... | H04N 21/458 |
| | | | | 725/77 |
| 2014/0011441 A1* | 1/2014 | Lauer | .................... | H04H 20/71 |
| | | | | 455/3.06 |
| 2016/0088318 A1* | 3/2016 | Healy | ................ | H04N 21/2146 |
| | | | | 725/5 |
| 2016/0285542 A1* | 9/2016 | Du | .................... | B64D 11/0015 |
| 2017/0339179 A1* | 11/2017 | Watson | .............. | H04L 63/0823 |

* cited by examiner

METHODS AND SYSTEMS FOR SHARING CONTENT ON A TRANSPORTATION VEHICLE

TECHNICAL FIELD

The present disclosure relates to transportation vehicles in general and more particularly, to using a peer-to-peer group for sharing content in a transportation vehicle system.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today provide video and/or audio entertainment systems at passenger seats. For example, many commercial airplanes have individualized video and audio entertainment systems, often referred to as "in-flight entertainment" or "IFE" systems. The entertainment systems use video displays that may be provided at each passenger seat, such as mounted at each of the seats of the passenger seats, and/or on cabin walls and/or deployable from an armrest for seats located at a bulkhead, i.e., in the first row of a section. Many of these systems allow passengers to select from various video channels and/or audio channels, or even individually select and play videos from a library of videos. These video displays may also provide access to games, communication applications (e.g., telephone service, messaging, etc.), Internet browsing, and other computer applications. Sometimes such displays are referred to as smart monitors due to the ability to provide computer applications and process and store data internally. Continuous efforts are being made to efficiently store and provide audio/video content to passengers at transportation vehicles.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

Figure 1A:
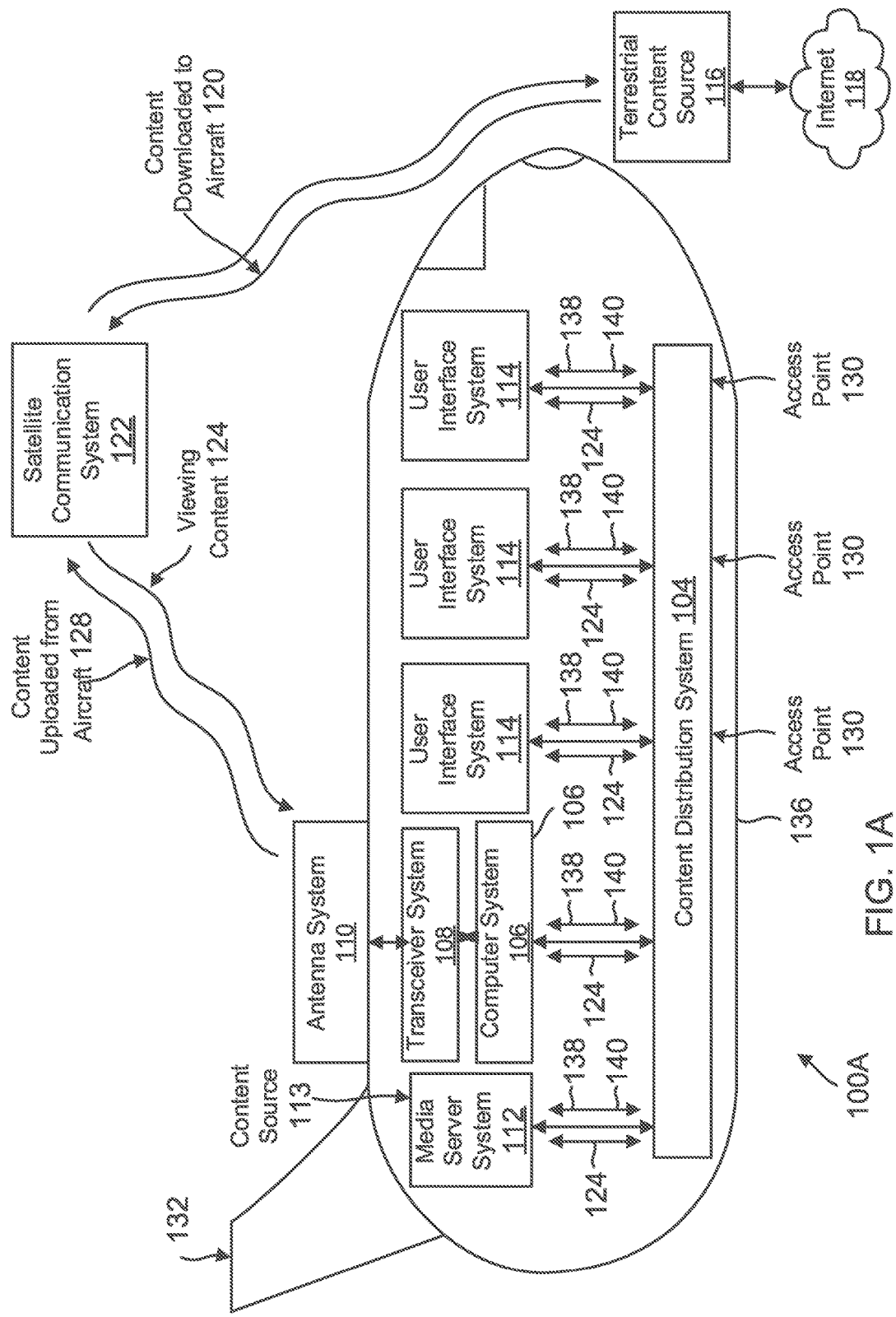
FIG. 1A shows an example of an operating environment for implementing the various aspects of the present disclosure on an aircraft.

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

In one aspect, methods and systems for a transportation vehicle are provided. For example, one method includes storing a first portion of a media file at a first device of a peer-to-peer group having a plurality of devices at a transportation vehicle; storing a remaining portion of the media file at one or more of the plurality of devices; using the first portion of the media file to start providing access to the media file; and retrieving the remaining portions of the media file, on-demand, from the one or more devices, based on resource utilization of the one or more devices.

In another aspect, a method includes creating a peer-to-peer group for storing media content on an aircraft, the peer-to-peer group having a plurality of seat devices and one or more seat electronic box (SEB) as members of the peer-to-peer group; storing a first portion of a media file at each of the plurality of seat devices; distributing the remaining portion of the media file among members of the peer-to-peer group; in response to a user request, providing access to the media file content using the first portion of the media file from the seat device that receives the request; and retrieving the remaining portions of the media file from one or more members of the peer-to-peer group, based on resource utilization of the one or more members.

In another aspect, a peer-to-peer model is provided where seat devices, seat box and/or PEDs operate as clients in a network (or cloud). Content can be streamed from multiple sources (or seeds/seeders) simultaneously and dynamically based on processor and network load, as described below in detail. The seeds can choose to throttle or reduce output based on the resource utilization of the seeds.

Vehicle Information System:

FIG. 1A shows an example of a generic vehicle information system 100A (also referred to as system 100A) that can be configured for installation aboard an aircraft 132 for using a peer-to-peer (P2P) model for managing media content, according to one aspect of the present disclosure. When installed on an aircraft, system 100A can comprise an aircraft passenger IFE system, such as the Series System 2000, System 3000, eX1, eX2, eX3, eXLite, eXW and/or other compatible in-flight entertainment system developed and provided by Panasonic Avionics Corporation (without derogation of any trademark rights of Panasonic Avionics Corporation) of Lake Forest, Calif., the assignee of this application.

System 100A comprises at least one content source 113 and one or more user (or passenger) interface systems (may also be referred to as a seat device/seatback device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or viewing content 120 downloaded via a satellite communication system 122, as desired. In another aspect, system 100A may not use a media server 112 and instead content is distributed across a plurality of devices throughout the aircraft, as described below in detail. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

When the server system 112 is installed at the aircraft, it can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or in addition to entertainment content, such as live satellite television programming and/or live satellite radio programming, the viewing content likewise can include two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122. System 100A thereby can receive (i.e., download to the aircraft) viewing content 120 from a selected terrestrial content source 116 and/or transmit (upload from the aircraft) content 128, including navigation and other control instructions, to the terrestrial content source 116. As desired, the terrestrial content source 116 can be configured to communicate with other terrestrial content sources (not shown), and aircraft to provide content from one aircraft to another. If desired, aircraft may also be configured to provide content directly from one to another by setting up an appropriate network, for example, a wireless network at an airport to which servers or other information processing devices aboard each aircraft connect. The terrestrial content source 116 is shown as providing access to the Internet 118. Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132 or any other location. The antenna system 110 can receive viewing content 124 from the terrestrial content source 116 and provide the received downloaded content 120, as processed by the transceiver system 108, to a computer system 106 of system 100A. The computer system 106 can provide the received content 120 to the media (or content) server system 112 and/or directly to one or more of the user interfaces 114 including a PED, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. The user interface system 114 includes a hardware interface to connect to an access point 130 that provides a wired and/or a wireless connection for the user interface system.

In at least one aspect, the user interface system 114 comprises a software application that a user downloads and installs on a PED to receive and view content via an access point 130. While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124 or for any other reason, payment information can be entered via the input system. The input system can be provided in any conventional manner and typically includes a touch screen, one or more switches (or pushbuttons), such as a keyboard or a keypad, and/or a pointing device, such as a mouse, trackball, or stylus. The input system may include newer input techniques as well, such as gesture based, eye-tracking, voice and/or handwriting recognition.

In one aspect, the user interface system 114 is provided at individual passenger seats of aircraft 132. The user interface system 114 can be adapted to different aircrafts and seating arrangements and the adaptive aspects described herein are not limited to any specific seat arrangements or user interface types.

Figure 1B:
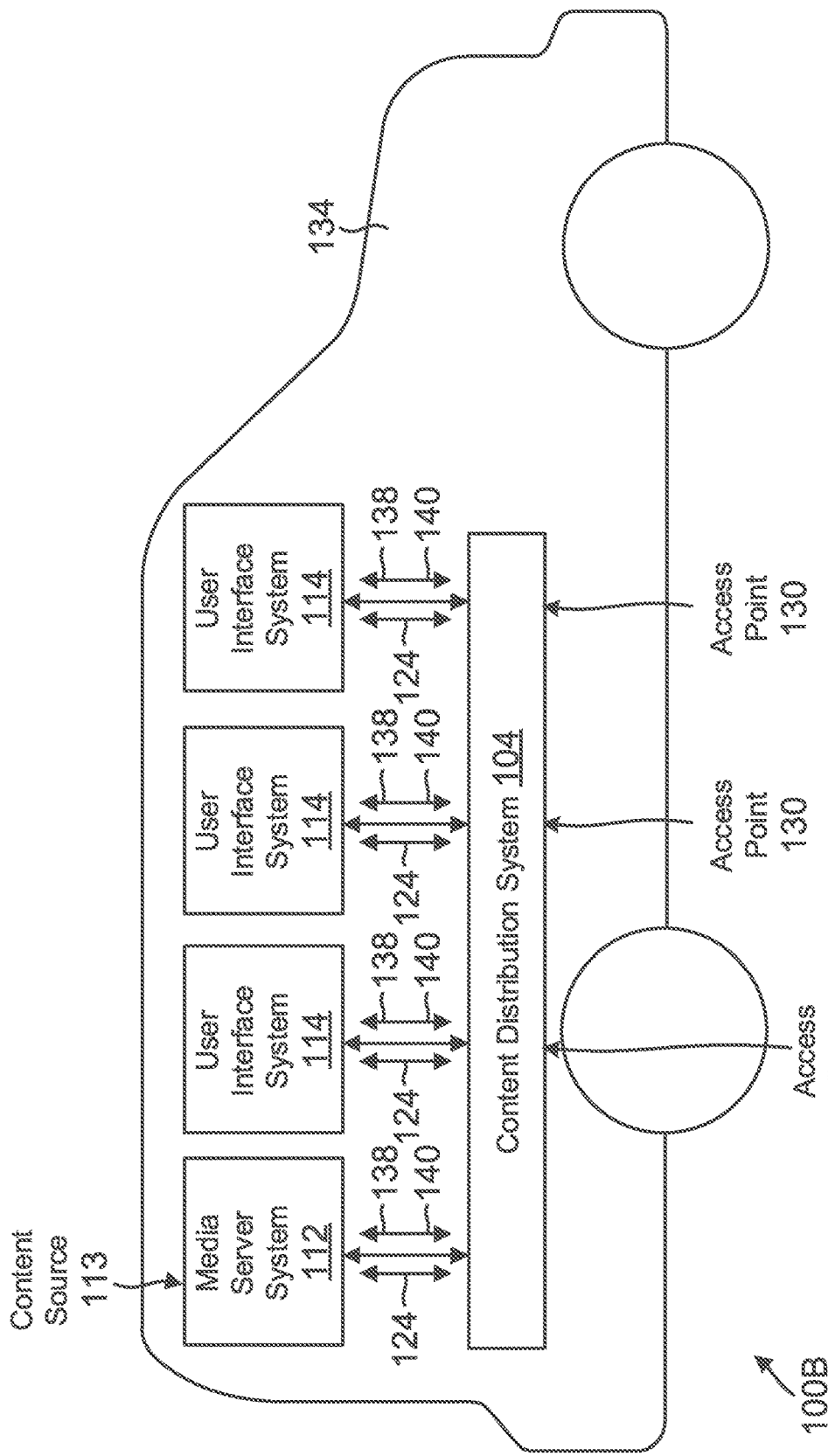
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
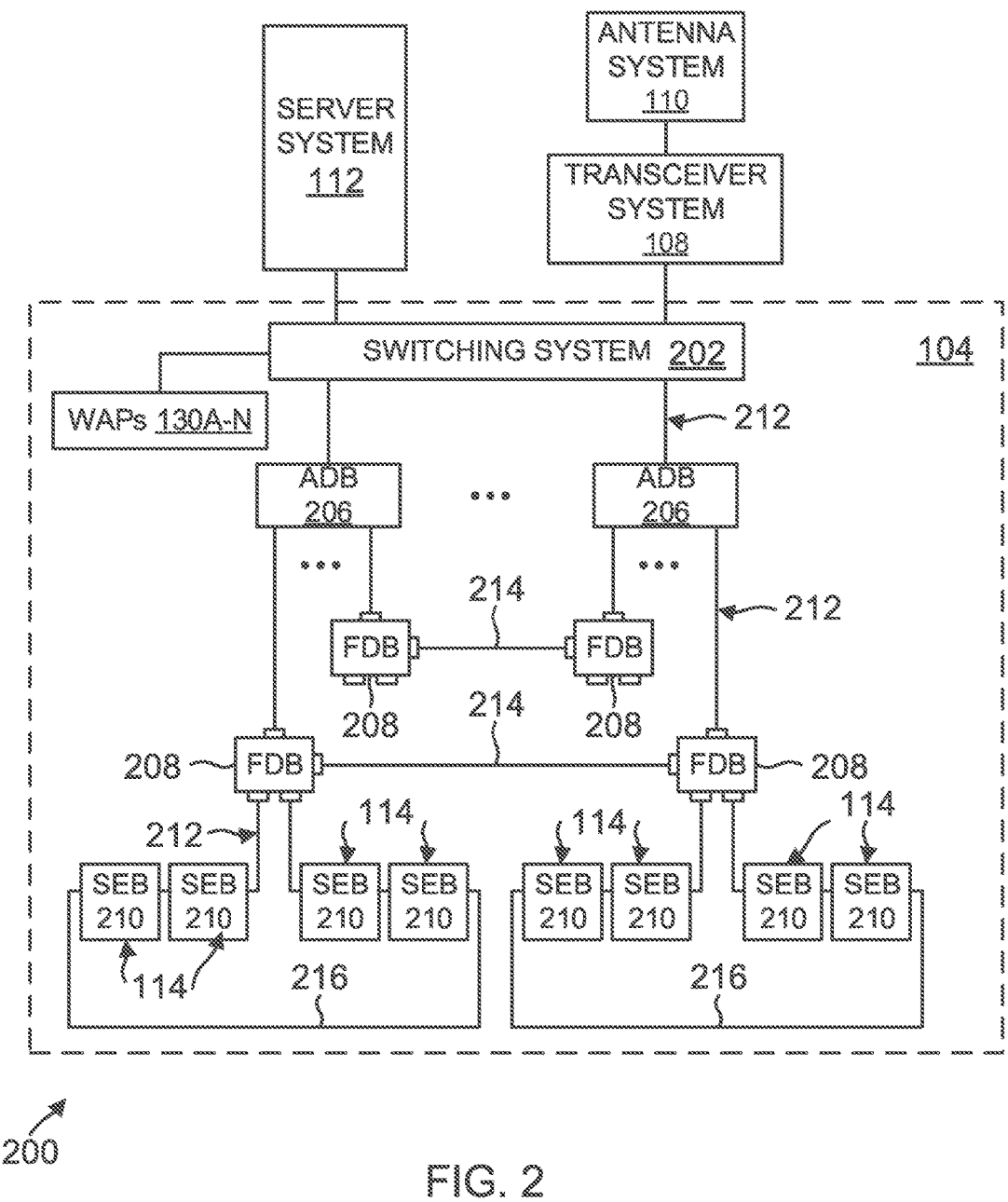
FIG. 2 shows an example of a content distribution system, used according to one aspect of the present disclosure.

Content Distribution System:

FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMAX Wireless Broadband, in accordance with IEEE Standard 802.16, and newer technologies. Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208 (FDBs are generally only used on Airbus wide-body aircraft), and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212. VSEBs are generally only used on older systems. Modern generation IFE systems typically include Power Network Boxes (PNBs), High Power Seatboxes (HPSs), DC Seat Electronic Boxes (DC-SEBs), as well as the aforementioned PSEBs 210. The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of seat electronics boxes 210. The seat electronics boxes 210, in turn, are configured to communicate with the user interface systems 114. Each seat electronics box 210 can support one or more of the user interface systems 114.

The switching systems 202, the area distribution boxes 206, the floor disconnect boxes 208, the seat electronics boxes (and/or video seat electronics boxes (VSEBs) and/or premium seat electronics boxes (PSEBs)) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last seat electronics box 210 in each daisy-chain of seat electronics boxes 210 for a selected floor disconnect box 208 as shown in FIG. 2. Each SEB loopback connection 216 therefore forms a loopback path among the daisy-chained seat electronics boxes 210 coupled with the relevant floor disconnect box 208. Some systems, however, do not include a loopback connection 216, as it not always desirable to have a loopback connection.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3A:
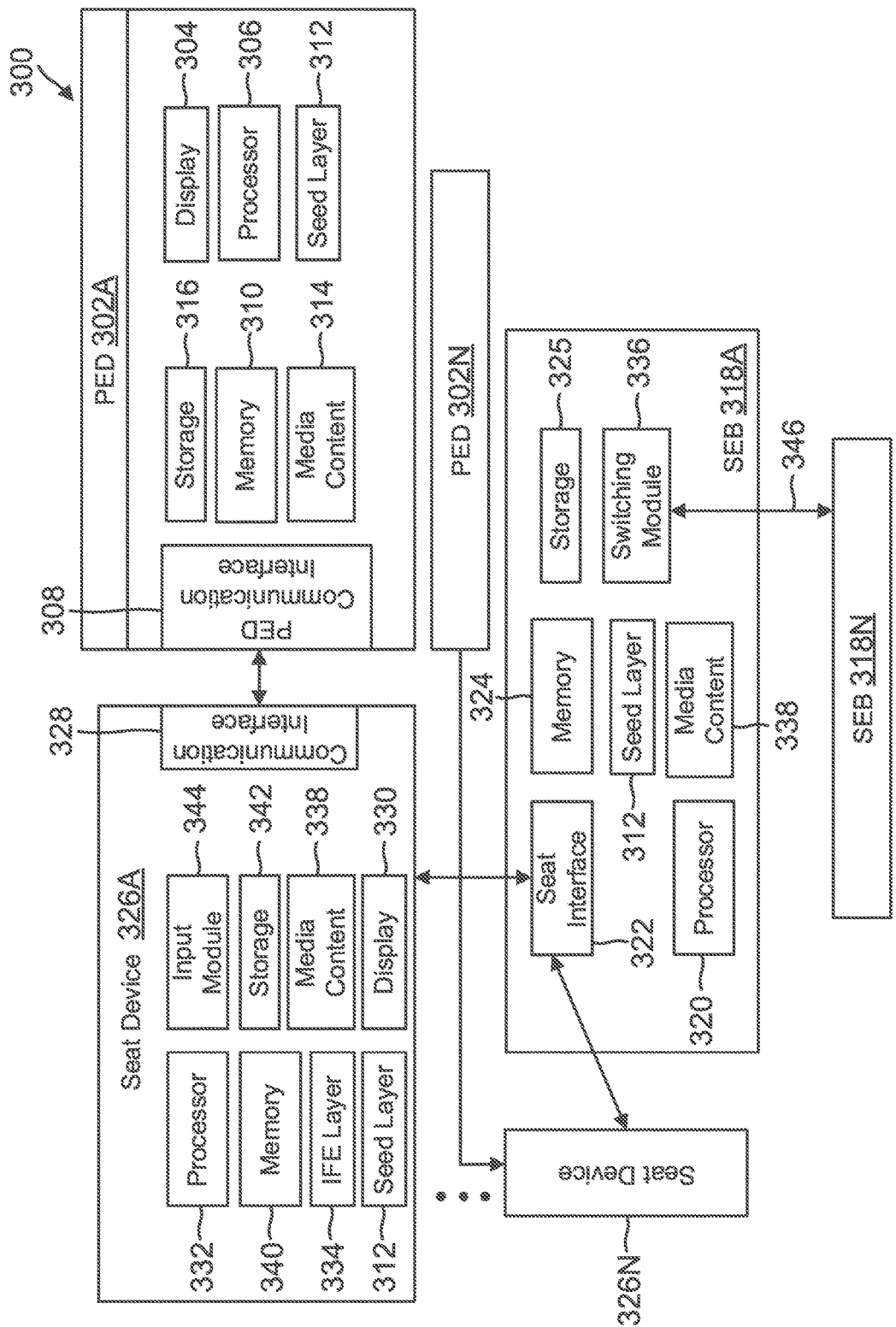
FIGS. 3A-3B show an example of a system for sharing content on a transportation vehicle, according to one aspect of the present disclosure.

Peer-to-Peer System:

FIG. 3A shows an example of a peer-to-peer (P2P) system 300 that includes one or more seat devices (may also be referred to as seatback devices) 326A-326N (may be referred to as seat device or seat devices 326), one or more SEBs 318A-318N (may be referred to as SEB or SEBs 318 (similar to SEB 210, FIG. 2)) and one or more personal electronic devices (PEDs) 302A-302N (may be referred to as PED or PEDs 302), in one aspect of the present disclosure. The seat device 326 may be part of the user interface system 114 or interfaces with the user interface system 114 described above with respect to FIGS. 1A/1B. It is noteworthy that the seat device 326 may be mounted on the back of a seat or supported from other structures, such as a bulkhead, wall, arm of a seat, etc. The adaptive aspects of the present disclosure are not limited to any specific location or orientation of the seat device 326. It is also noteworthy that system 300 may include a crew management device (not shown), an onboard management system that may be similar to computer system 106 and/or server 112 described above with respect to FIGS. 1A/1B. The crew management device and/or the onboard management system may be used to configure one or more components of system 300.

The various devices of system 300 may operate as peers or "seeds" (may also be referred to as "seeders") within a virtual local storage (VLS) group. The term peer, seed and seeders may be used interchangeably throughout this specification. In this configuration portions of a media file are stored at different seeds and then made available to a seat device on demand, as described below in detail.

In one aspect, the seat device 326A includes a display device 330, a processor 332, a memory 340, a communication interface 328 and a local storage device 342 for storing content. The seat device 326A receives user input/requests via an input module 344. The input module 344 may be configured to use a local touch screen at display 330, a local virtual keyboard, an external mouse, external keyboard or any other input device. The various adaptive aspects described herein are not limited to any specific input device.

Processor 332 has access to memory 340 and other devices through a bus system (not shown). The bus system may be an abstraction that represents any one or more separate physical buses and/or point-to-point connections, connected by appropriate bridges, adapters and/or controllers. The bus system, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 340 represents any form of random access memory (RAM), read-only memory (ROM), flash memory, or the like, or a combination of such devices. Storage device 342 includes a storage device to store data in a non-volatile manner, such as one or more flash memory, solid-state drive or any other storage device type.

In one aspect, processor 332 executes an IFE layer 334 or a portion thereof, out of memory 340. The IFE layer 334 provides in-flight entertainment and other options to users. The IFE layer 334 provides audio/video content as well as controls for accessing the content. The IFE layer 334 uses the communication interface 328 to interface with SEB 318A, the PED 302 and/or other devices (not shown), when available.

The communication interface 328 includes logic and circuitry for providing wireless and/or wired connections to SEB 318A/PED 302A and other devices. The logic and circuitry depends on the network protocols and standards used for network communication.

In one aspect, as mentioned above, seat device 326A is a part of a VLS group that includes more than one device. The devices within the VLS group are part of a peer-to-peer network, where each device operates as a node/seed, where a node may be a seat device, a SEB, a PED, a media server (if installed) and other devices. The devices within the VLS group operate as peers for sharing media content 338. Media content 338 may include a subset of a media file, for example, a portion of a movie or an audio file, as described below in detail. In one aspect, media content 338 is stored at storage device 342.

To manage media content, i.e., storing and sharing, the seat device 326A executes a seed layer 312. In one aspect, the seed layer 312 may be stored on a non-transitory storage medium, such as a hard drive, CD, CD-ROM, DVD, flash memory, or any other storage device (volatile or non-volatile), etc.

In one aspect, the seed layer 312 uses the "BitTorrent" protocol to enable sharing of media content between different seat devices, SEBs and PEDs. BitTorrent is a standard communications protocol that enables peer-to-peer file sharing to distribute data over a network. Under the BitTorrent protocol, to upload a file, a torrent descriptor file is created and distributed to various nodes. The file may be made available through a BitTorrent node acting as a seed. The nodes with the torrent descriptor file give the descriptor file to their own BitTorrent nodes, which act as peers.

For segmented file transfer under BitTorrent, the media file for distribution is divided into segments called pieces. As each peer receives a new piece of the file, the peer becomes a source for other peers, relieving the original seed from having to send that piece to every node. Each piece may be protected by a cryptographic hash contained in the torrent descriptor. This ensures that any modification of the piece can be reliably detected, and thus prevents both accidental and malicious modifications of any of the pieces received at other nodes. File segments may be downloaded by the seeds non-sequentially and rearranged into the correct order by a BitTorrent Client (for example, seed layer 312), which monitors which pieces it needs, and which pieces it has and can upload to other peers. Pieces maybe of the same size for a single download. It is noteworthy that the adaptive aspects described herein are not limited to any specific protocol.

In one aspect, the seed layer 312 may track the usage of various resources of the seat device, for example, processor 332, memory 340 and transfer rate from the communication interface 328. The resources are tracked so that the optimum peers are used for downloading segmented media files. In another aspect, the seat device 326A executes a utility (not shown) to monitor seat device 326A resource utilization. In that configuration, the monitoring utility interfaces with the seed layer 312.

In one aspect, a segment of a media file, for example, the first 5-10 minutes of a movie may be stored at multiple sources or seeds. When a passenger at a seat device wants to view the movie, the movie starts immediately at the seat device (or the PED) and the remaining portions of the movie are streamed from other peers based on the resource utilization of the peers, based on their workloads and resource utilization, for example, processor utilization, memory utilization, network transfer rate and other parameters. While the passenger is watching the first 5-10 minute of the media file, the rest of the file is being downloaded and assembled in the background. As long as several minutes of the file is buffered ahead of what the passenger is viewing, the operation is seamless.

If the passenger decides to fast forward to a portion of the file that has not been downloaded and assembled yet, the system may stream the content from a source having the entire file, e.g., a server or other source aboard the aircraft. When the passenger stops fast forwarding, the system starts buffering from the new location in the file. This will create some delay or lag, but selectively streaming from a server only for fast forward limits the load on the server and enables the server to handle requests smoothly. Streaming from the server is also performed for rewinding if the passenger has fast forwarded to a location, and then rewound to a location in the file not yet downloaded and assembled.

A seat device that is being used to watch a movie by a passenger may limit streaming for other peer devices. When the seat device is inactive, for example, when a passenger is resting and no longer using the device, the seat device can increase its streaming rate and advertise its availability to its peers. A significant advantage is that the system may provide load balancing. For example, a peer that may be using multiple seeds may drop other seeds to obtain content from the inactive device to improve load balancing. Details of using the seed layer 312 and sharing media content 338 are provided below.

In one aspect, SEB 318A includes a seat interface 322 to communicate with one or more seat devices 326. The seat interface 322 may be configured for a wired and/or a wireless connection. The seat interface 322 includes logic and circuitry for providing wired and/or wireless connection. SEB 318A also includes a switching module 336 that communicates with other SEBs using a network connection 346, described above with respect to FIG. 2.

In one aspect, SEB 318A may also include a processor 320 with access to memory 324 and storage 325. The seed layer 312 may also be executed at the SEB 318A to enable the SEB to operate as a seed within a VLS group. When the SEB operates as a seed, media content 338 may be shared among multiple seat devices described above.

Processor 320 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 324 represents any form of random access memory (RAM), read-only memory (ROM), flash memory, or the like, or a combination of such devices. Storage device 325 includes a storage device to store data in a non-volatile manner, such as one or more flash memory, solid-state drive or any other storage device type.

In one aspect, PED 302A may also be configured to operate as a seed, and may include a smart watch, mobile phone, a notebook, a tablet, a laptop or any other similar device. PED 302A may also include a processor 306 that has access to a memory 310 via an interconnect/bus system (not shown) for executing stored instructions. Memory devices, such as SSDs can also behave as seeds if controlled by a processor, such as processor 302.

Processor 302 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

302A includes a storage device 316 that may be, or may include any storage medium for storing data in a non-volatile manner, such as one or more magnetic or optical based disks, flash memory, or solid-state drive. The storage device 316 may be used to store content displayed on a display 304 of PED 302A. In one aspect, display 304 may include a touch screen for receiving input commands. In another aspect, the storage device 316 may comprise a memory card inserted or plugged into a crew terminal (CT), onboard media loader (OML), or an SSD/HDD in a storage rack or other location aboard the vehicle.

In one aspect, PED communication module 308 may include one or more interfaces to communicate with different devices, including a Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module may have different interface, cards, logic and circuitry to comply with the different communication protocols/standards.

In one aspect, processor 306 may also execute the seed layer 312 that enables the PED 302A to operate as a seed within a VLS group. In one aspect, the seed layer 312 is downloaded to the PED after the PED is authenticated and authorized to communicate with the seat device 326A and the IFE layer 334.

Figure 3B:
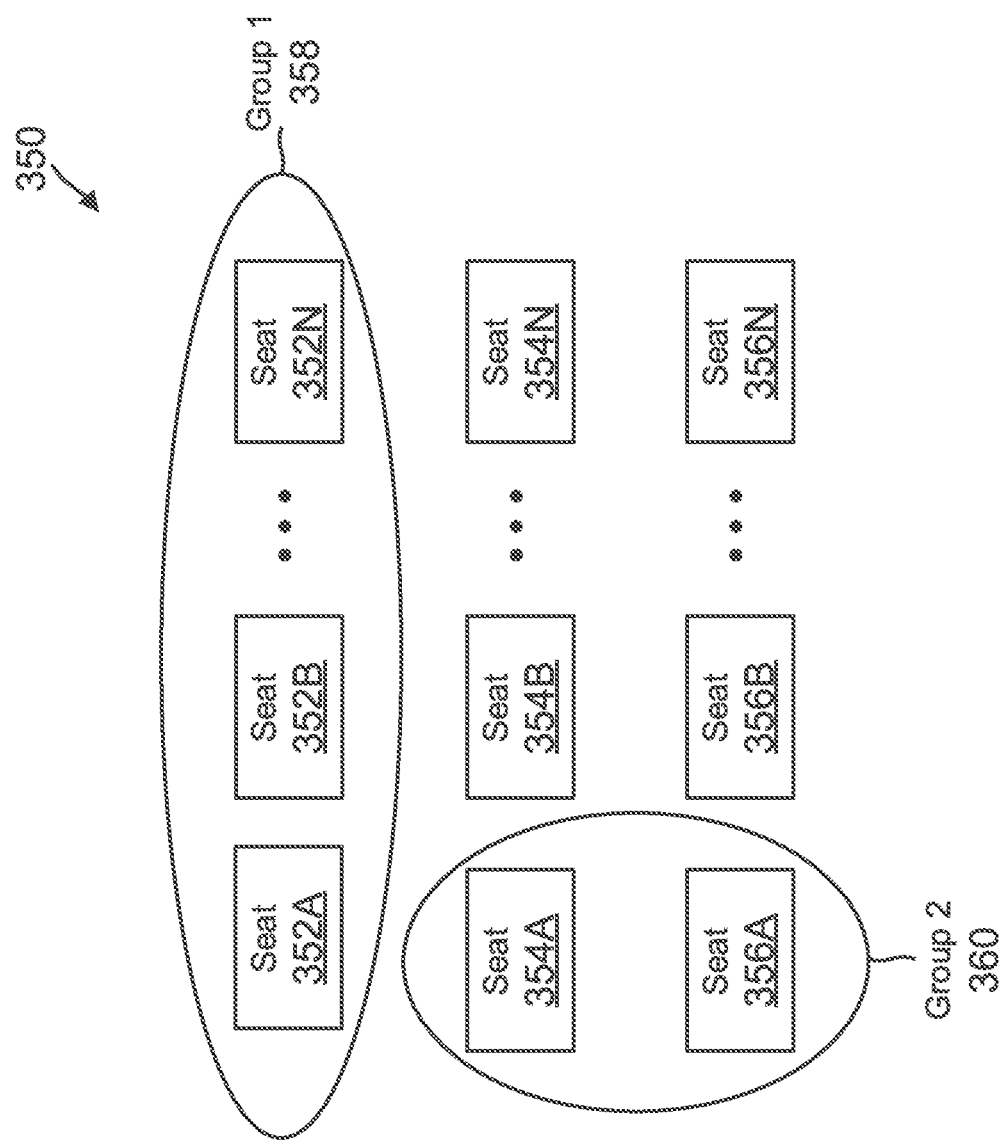

FIG. 3B shows an example 350 of using a VLS group from among seats 352A-352N, 354A-354N and 356A-356N. For example, a first VLS group 358 includes seats 352A-352N, while a second VLS group 360 includes seats 354A-356A. The various aspects described herein are not limited to any particular number of devices within a group.

In one aspect, the VLS group is generated based on a real-time, layout of the passenger seats, the resources available at the seats (for example, memory capacity/speed, storage device capacity and speed, network capabilities (data transfer rate) and other factors. Details of configuring a VLS group are provided below.

Figure 4A:
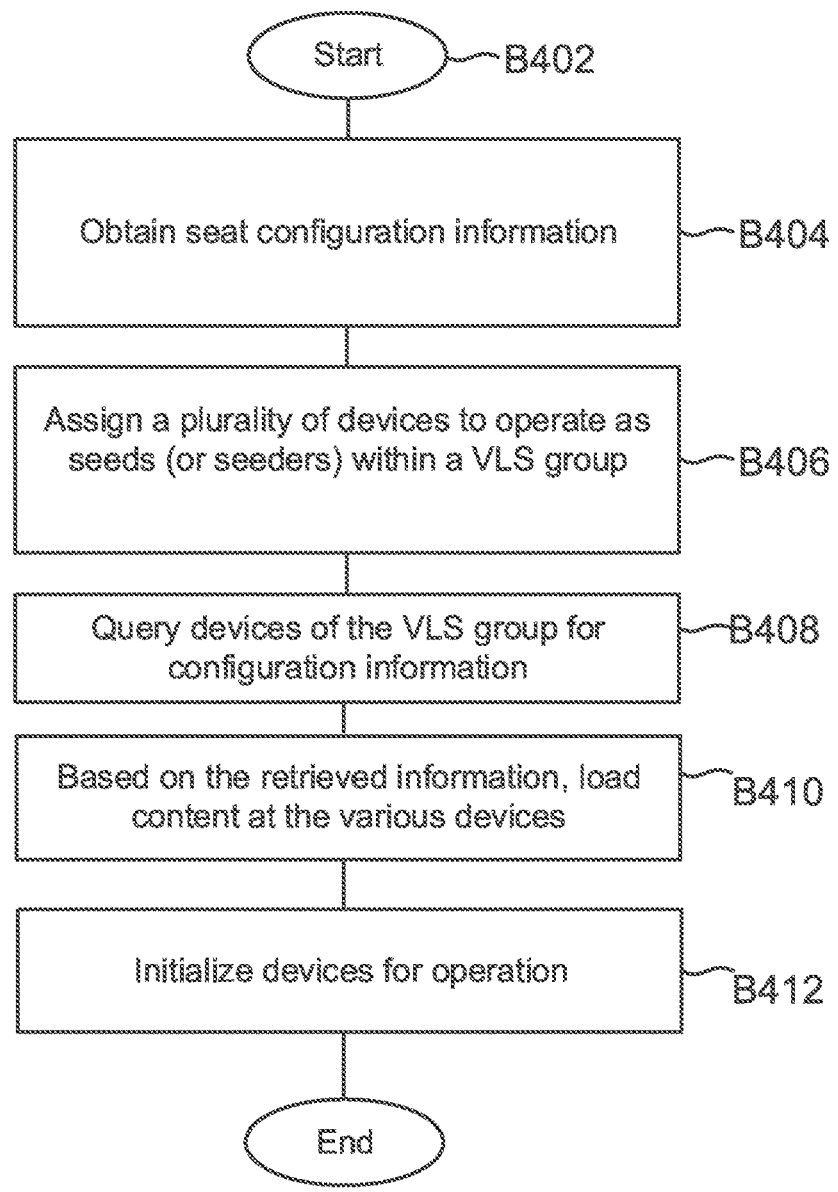
FIGS. 4A-4C shows process flows for using a peer-to-peer group for sharing content on a transportation vehicle, according to one aspect of the present disclosure.

Process Flow:

FIG. 4A shows a process 400 for configuring a plurality of devices for a VLS group to share content at a transportation vehicle, for example, an aircraft, according to one aspect of the present disclosure. The example described below is for an aircraft but is equally applicable to any other type of transportation vehicle. The VLS group is not limited to any specific number or type of devices. In one aspect, the VLS group may include a seat device, a SEB, a PED, a media server, when installed or any other device type. It is noteworthy that the various adaptive aspects described herein can be implemented without a media server.

The process begins in block B402, when a management application for configuring the VLS is initialized. For convenience, the process preferably begins automatically, such as when new content is identified by the system. Example includes when an OML is placed in communication with the system, an SD card or other memory device is plugged in at a crew terminal, upload of new content is completed from a ground-based server, etc. The management application may be part of or interface with the seed layer 312, described above with respect to FIG. 3A. The management application may be executed by an authorized crew device, an onboard management server, if installed (for example, computer system 106, media server 112 and others) or any other authorized computing device. The various adaptive aspects described herein are not limited to where and what sort of device is used to implement the management application for executing the configuration process.

In block B404, the layout information of the aircraft is retrieved. The layout information may be based on a real-time image of the inside of the aircraft taken from a PED or any other device.

In block B406, a plurality of devices are assigned to a VLS group. The VLS group is uniquely identified and each device within the group is also uniquely identified.

In block B408, the plurality of devices within the group are queried for obtaining configuration information. The configuration information includes memory capacity/type, storage capacity/type, processor details, communication ability and other information. This information may also be obtained from a data structure or database maintained at the aircraft or by a ground server.

Alternatively, block B408 may be performed prior to block B406. For instance, economy class may have lower performance devices, e.g., slower processors, less memory, etc., relative to devices in premium classes. In this situation, these factors are taken into consideration in assigning the devices to a VLS group in block B406. For example, VLS groups comprising lower performance devices, may include fewer group members to limit the potential load on lower performing devices.

In block B410, based on the retrieved information, content is loaded among the various devices of the VLS group, for example, seat devices, SEBs and when installed a media server 112. In one aspect, a same portion of each media file (for example, a movie) is loaded at each seat device. The remaining portion may be spread-out among different devices. A metafile describes the overall media file and the various portions that are stored among different devices. In one aspect, the various seeds are considered the same and are differentiated when they are streaming content, based on ability. The manner in which the content is loaded and distributed is to optimize storage space as well as to reduce latency in accessing the information. Thereafter, the devices are initialized for operation in block B412.

Figure 4B:
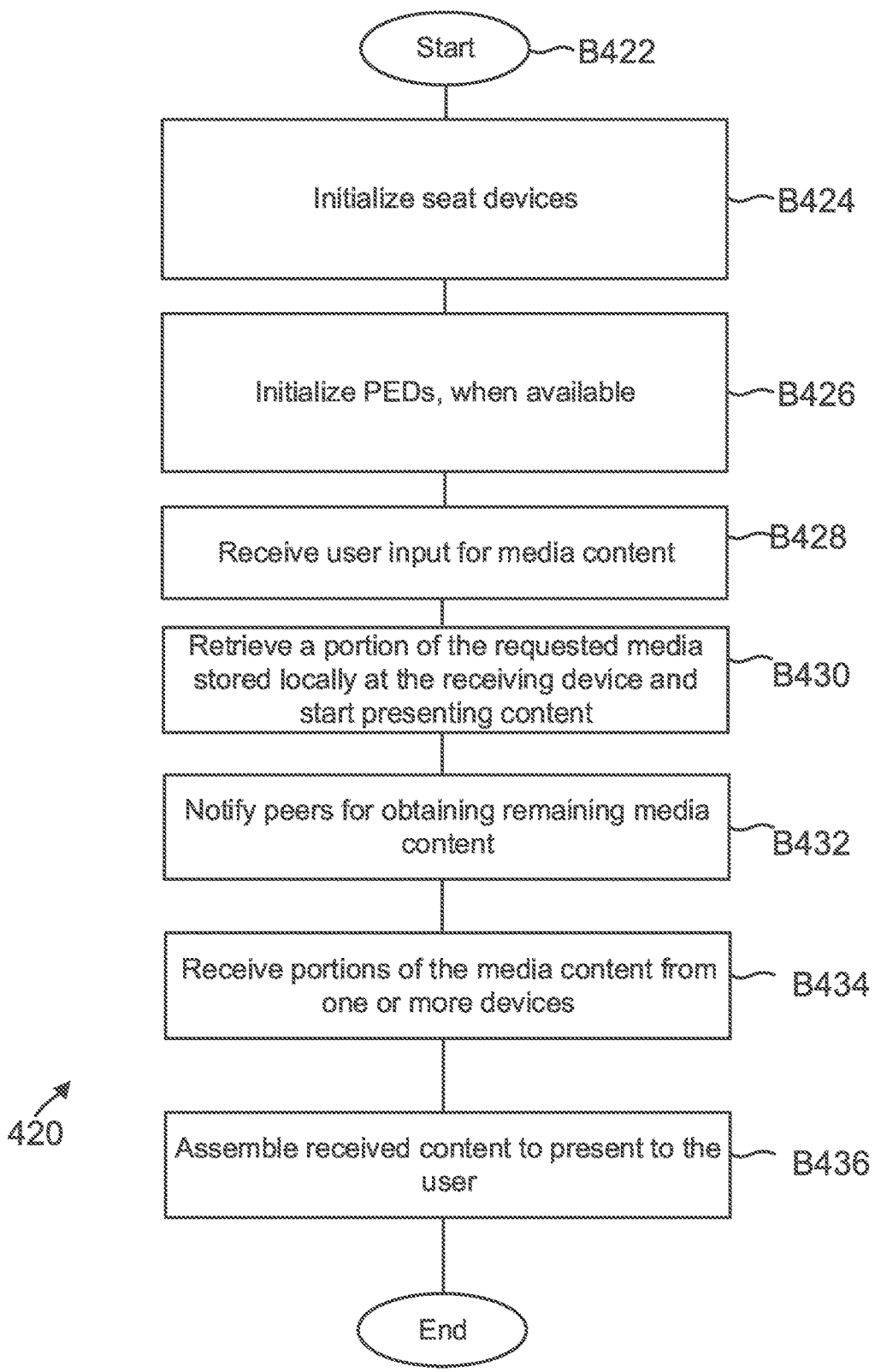

FIG. 4B shows a process 420 for using a peer-to-peer, VLS group, according to one aspect of the present disclosure. The process begins in block B422, when a VLS group has been configured and media content has been loaded at the various devices of the aircraft. The seat device at each passenger seat is initialized in block B424. This makes the device ready to receive an input, for example, a request to access available media, for example, a request to watch a movie.

If PEDs are available, then the PEDs are paired to the seat devices and initialized in block B426. The PEDs are paired or associated with the seat device based on an authentication process, the details of which are not germane to the various aspects of the present disclosure.

In block B428, a user input is received for accessing content at a receiving device. For example, the request may be to watch a movie. Upon receiving the request, the IFE layer 334 retrieves a metafile for the requested content. Using the metafile, the IFE layer 334 obtains the portion of the media file from local storage, for example, storage 342 that may store a threshold amount of data to start displaying the movie. This enables the seat device 326 to process the request immediately, while the remaining content is retrieved from other seeders as described below. In one aspect, the metafile for the requested content may also identify or include a pointer to a data structure that stores the identity of the other devices that store the remaining content for the movie.

In block B434, the receiving device requests the peers for the remaining content. In one aspect, the peers send the remaining portions of the movie to the receiving device. The peers are able to throttle the download speed based on resource utilization, as described below with respect to FIG. 4C. The received content is stored in a buffer and assembled for display in block B436. The buffer may be located at memory 340 or any other location. Thereafter, the user request is completed and the process ends, until a new request is received.

Figure 4C:
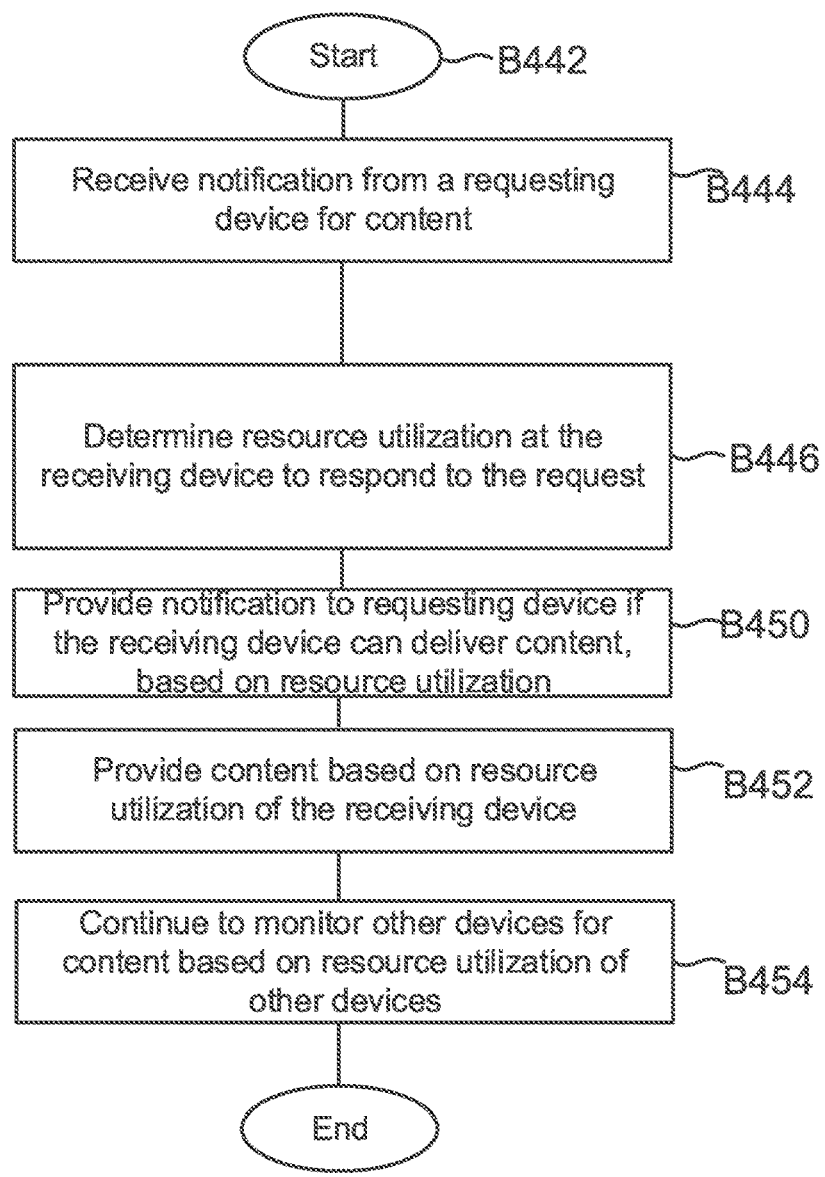

FIG. 4C shows a process 440 for managing content download at a seat device from other peers, according to one aspect of the present disclosure. The process begins in block B442, when a VLS group has been created, a user request for content is received and the process for presenting the initial portion of the content has started.

In block B444, a requesting device sends a request to a peer device for content. The request identifies the content. In one aspect, content is stored using object identifiers, instead of a conventional file name. This enables the system to store different portions of a media file and locate it easily.

In block B446, the resource utilization for the device receiving the request from the requesting device is determined. This may be implemented by a monitoring application on an ongoing basis. The monitored data may be stored in a data structure (not shown) or a database, residing in onboard server or crew terminal. The data structure or database may provide the processor utilization, memory usage, storage device usage, average data transfer rate, and an indication if the device is currently being used or any other metric. In one aspect, the resource utilization may be defined by a weighted system where different resources are provided a weight and an overall utilization value is tracked by the monitoring application. In another aspect, the resource utilization may be based on giving each parameter equal weight. The system described herein provides a flexible configurable system.

In block B450, the requesting device is notified whether the device that received the request for content is able to deliver the content. If yes, then in block B452, the content is downloaded. If the device cannot provide the content, then the requesting device requests another device within the same group or another group for the content. In another aspect, if the aircraft has the media server 112 installed, then the media server may be requested for the content.

In block B454, the various devices within the group are monitored so that if they free up resources or become busy (for example, if a passenger stops using a device or starts using a device), then the requesting device may either drop a specific device or use another device for content, based on their resource utilization.

In one aspect, the methods and systems provided herein provide an efficient solution for a transportation vehicle where content storage is optimized without having to rely on a media server. Seat devices are smart and able to operate as peer devices within a peer-to-peer network.

In one aspect, the foregoing methods and systems provide multiple redundancies. Content is streamed from multiple LRUs (peers/seeds) concurrently. This enables processors of varying capabilities to be used because content is streamed simultaneously. Furthermore, local storage at the seat devices and/or SEBs does not have to be large since only a portion of the pre-loaded media files are stored at the seat devices.

Figure 5:
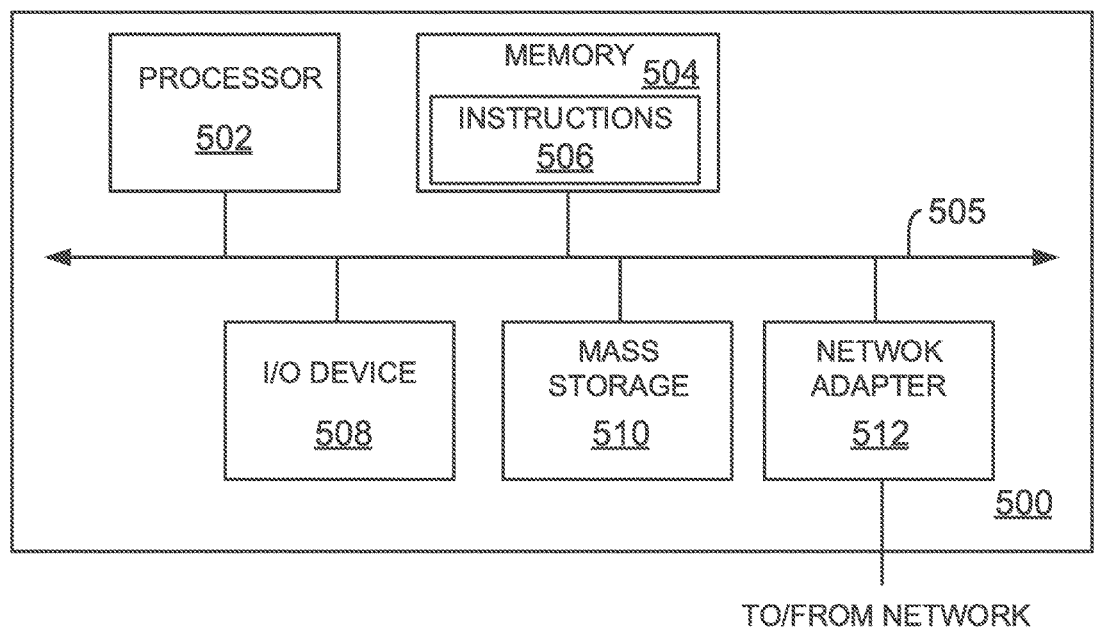
FIG. 5 shows a block diagram of a computing system, used according to one aspect of the present disclosure.

Processing System:

FIG. 5 is a high-level block diagram showing an example of the architecture of a processing system 500 that may be used according to one aspect. The processing system 500 can represent seat device 326, PED 302, media server 112, computing system 106, or any other device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the seed layer 312 and/or the process steps of FIGS. 4A-4C described above.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for a peer-to-peer network on a transportation vehicle have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims, in which examples and alternative configurations and arrangements have been described in the disclosure for purposes of illustrative, non-limiting example.

What is claimed is:

1. A machine implemented method, comprising:
storing a first portion of a media file at a first local storage device of a first device from among a plurality of devices of an entertainment system at a transportation vehicle; wherein the first portion is also stored at local storage devices of the plurality of devices for initiating access to the media file by any device receiving any media file request;
storing a remaining portion of the media file at one or more local storage devices of other plurality of devices from among the plurality of devices, based on resource availability of the other plurality of devices and location of the other plurality of devices within the transportation vehicle determined by a layout of the transportation vehicle;
using the first portion of the media file by the first device to start providing access to the media file from the first local storage device;
transmitting a request for the remaining portion by the first device to a second device, the second device storing at least a portion of the remaining portion at a second local storage device; and
retrieving at least the portion of the remaining portion of the media file from the second device, when the second device is able to provide the at least portion of the remaining portion, based on resource utilization of the second device;
wherein when the second device is unable to stream the at least portion of the remaining portion due to resource utilization, the second device notifies the first device and the first device seeks the at least portion of the remaining portion from another device that stores the at least portion of the remaining portion and has available resources for streaming the at least portion of the remaining portion;
wherein the transportation vehicle is an aircraft, and the plurality of devices at least include one of a seat device, a seat electronic box and a personal electronic device;
wherein the first device is a first seat device from among a plurality of seat devices of the aircraft that receives a request for the media file and uses the first portion stored at the first seat device to start presenting the media file.

2. The method of claim 1, wherein the first seat device that receives the request obtains the remaining portion of the media file from other seat devices, based on resource utilization of the other seat devices.

3. The method of claim 1, wherein the first seat device that receives the request obtains the remaining portion of the media file from a seat electronic box.

4. The method of claim 1, wherein the first seat device that receives the request obtains the remaining portion of the media file from a personal electronic device paired to the first seat device.

5. The method of claim 1, wherein the transportation vehicle is one or more of a train, bus, boat and recreation vehicle.

6. A system, comprising:
a memory containing machine readable medium comprising machine executable code having stored thereon instructions; and a processor module coupled to the memory, the processor module configured to execute the machine executable code to:
store a first portion of a media file at a first local storage device of a first device from among a plurality of devices of an entertainment system at a transportation vehicle; wherein the first portion is also stored at local storage devices of the plurality of devices for initiating access to the media file by any device receiving any media file request;
store a remaining portion of the media file at one or more local storage devices of other plurality of devices from among the plurality of devices, based on resource availability of the other plurality of devices and location of the other plurality of devices within the transportation vehicle determined by a layout of the transportation vehicle;
use the first portion of the media file by the first device to start providing access to the media file from the first local storage device;
transmit a request for the remaining portion by the first device to a second device, the second device storing at least a portion of the remaining portion at a second local storage device; and
retrieve at least the portion of the remaining portion of the media file from the second device, when the second device is able to provide the at least portion of the remaining portion, based on resource utilization of the second device;
wherein when the second device is unable to stream the at least portion of the remaining portion due to resource utilization, the second device notifies the first device and the first device seeks the at least portion of the remaining portion from another device that stores the at least portion of the remaining portion and has available resources for streaming the at least portion of the remaining portion;
wherein the transportation vehicle is an aircraft, and the plurality of devices include at least one of a seat device, a seat electronic box and a personal electronic device;
wherein the first device is a first seat device from among a plurality of seat devices of the aircraft that receives a request for the media file and uses the first portion stored at the first seat device to start presenting the media file.

7. The system of claim 6, wherein the first seat device that receives the request obtains remaining portion of the media file from other seat devices, based on resource utilization of the other seat devices.

8. The system of claim 6, wherein the first seat device that receives a request obtains the remaining portion of the media file from a seat electronic box.

9. The system of claim 6, wherein the first seat device that receives the request obtains the remaining portion of the media file from a personal electronic device paired to the first seat device.

10. The system of claim 6, wherein the transportation vehicle is one or more of a train, bus, boat and recreation vehicle.

11. A method, comprising:
receiving a request for a media file by a first seat device of a plurality of seat devices of an in-flight entertainment system of an aircraft;
wherein a first portion of the media file is stored at local storage devices of the plurality of seat devices and a remaining portion of the media file is distributed among a certain number of seat devices, based on resources of the certain number of seat devices and location of the certain number of seat devices within the aircraft,
in response to the request, the first seat device retrieves the first portion of the media file from a first local storage device of the first seat device and starts playing the media file using the first portion;
transmitting a request to a second seat device from among the certain number of seat devices for a second portion of the media file;
determining by the second seat device whether the second device can stream the second portion to the first seat device, based on resource utilization of the second device;
transmitting the second portion by the second seat device to the first seat device, when resource utilization at the second seat device is below a threshold value;
retrieving the second portion from a third seat device, when resource utilization at the second seat device has reached a threshold value and resource utilization at the third seat device is below the threshold value; and
using the second portion by the first seat device to continue playing the media file.

12. The method of claim 11, wherein when a user attempts to fast forward the media file to a segment that has not been downloaded at the first seat device, then the first seat device retrieves the entire media file from a server at the aircraft.

13. The method of claim 11, wherein the first seat device retrieves the second portion from a personal electronic device (PED) on the aircraft paired with the first seat device.

14. The method of claim 11, wherein the certain number of seat devices are part of a uniquely identified virtual local storage (VLS) group, and the certain number of seat devices vary based on seat device capabilities.

15. The method of claim 11, wherein the first seat device drops the second device for streaming the second portion, when a different seat device becomes inactive and has higher resource availability then the second device.

16. The method of claim 11, wherein each portion of the media file distributed among the certain number of seat devices is uniquely identified by an object identifier that is used by the first seat device to retrieve the remaining portion of the media file.

* * * * *